United States Patent
Malatesta et al.

(10) Patent No.: US 6,651,878 B2
(45) Date of Patent: Nov. 25, 2003

(54) MAIL WEIGHING SYSTEM AND METHOD

(75) Inventors: James Malatesta, Hockessin, DE (US); Edward Cohen, Mt. Laurel, NJ (US)

(73) Assignee: Tritek Inc., Hockessin, DE (US)

( * ) Notice: Subject to any disclaimer, the term of this patent is extended or adjusted under 35 U.S.C. 154(b) by 159 days.

(21) Appl. No.: 10/010,236

(22) Filed: Dec. 7, 2001

(65) Prior Publication Data

US 2003/0106932 A1 Jun. 12, 2003

(51) Int. Cl.[7] .................... G06F 17/00; G06K 15/00
(52) U.S. Cl. .................. 235/375; 235/383; 235/385
(58) Field of Search ................... 235/383, 375, 235/382, 380; 705/31, 410, 400, 402; 707/104.1, 4; 380/51

(56) References Cited

U.S. PATENT DOCUMENTS

| | | | | |
|---|---|---|---|---|
| 5,875,415 A | * | 2/1999 | Lieb et al. ............. | 702/122 |
| 6,005,945 A | * | 12/1999 | Whitehouse .......... | 380/51 |
| 6,032,128 A | * | 2/2000 | Morrison et al. ........ | 705/23 |
| 6,105,014 A | * | 8/2000 | Ramsden et al. ....... | 705/410 |
| 6,466,948 B1 | * | 10/2002 | Levitsky et al. ........ | 707/104.1 |
| 2002/0010665 A1 | * | 1/2002 | Lefebvre et al. ........ | 705/31 |
| 2002/0046196 A1 | * | 4/2002 | Ogg ..................... | 705/406 |
| 2003/0106932 A1 | * | 6/2003 | Malatesta et al. ....... | 235/375 |

* cited by examiner

Primary Examiner—Thien M. Le
(74) Attorney, Agent, or Firm—Schnader Harrison Segal & Lewis LLP

(57) ABSTRACT

A method of processing a plurality of mail items in an automated system without isolating each mail item on a scale. The method includes creation of a mail item record that identifies the item and includes the weight. Mail items may be weighed by determining a first scale weight reading, introducing a mail item onto the scale, determining the mail item weight at one or more times within a time window, and finding the difference between each consecutive scale weight. Differences between scale weight readings not equal to zero are outputted. All outputted scale weight readings are totaled to obtain the mail item weight. Further disclosed are a mail processing system and a method of ceasing mail processing when invalid weights are detected.

32 Claims, 5 Drawing Sheets

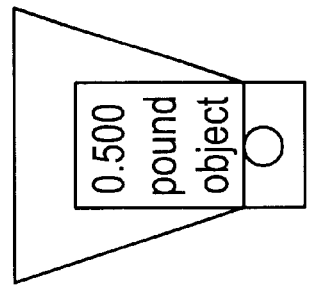
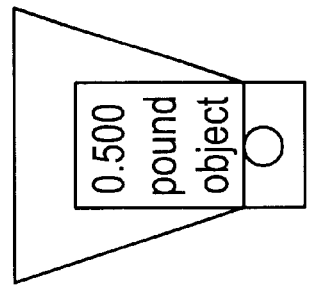
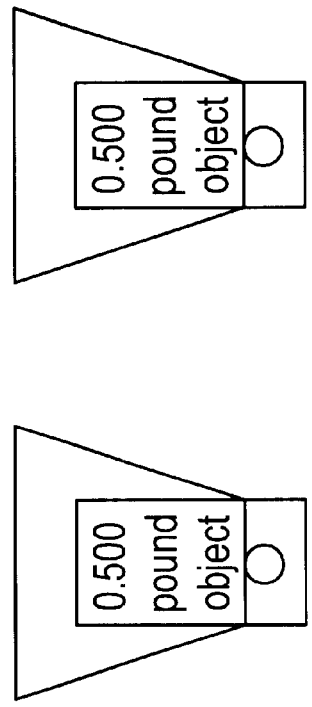
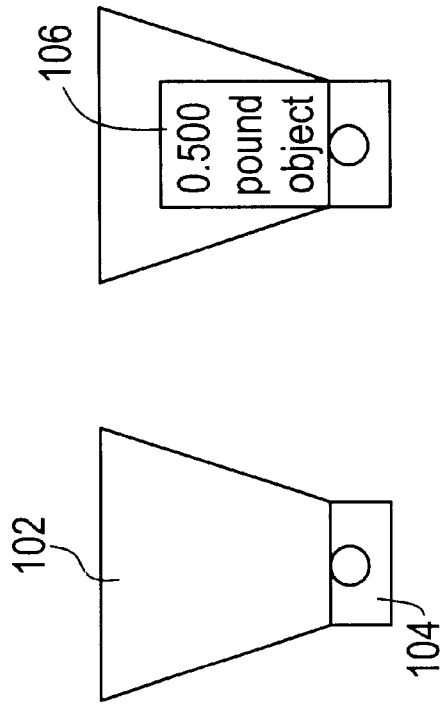

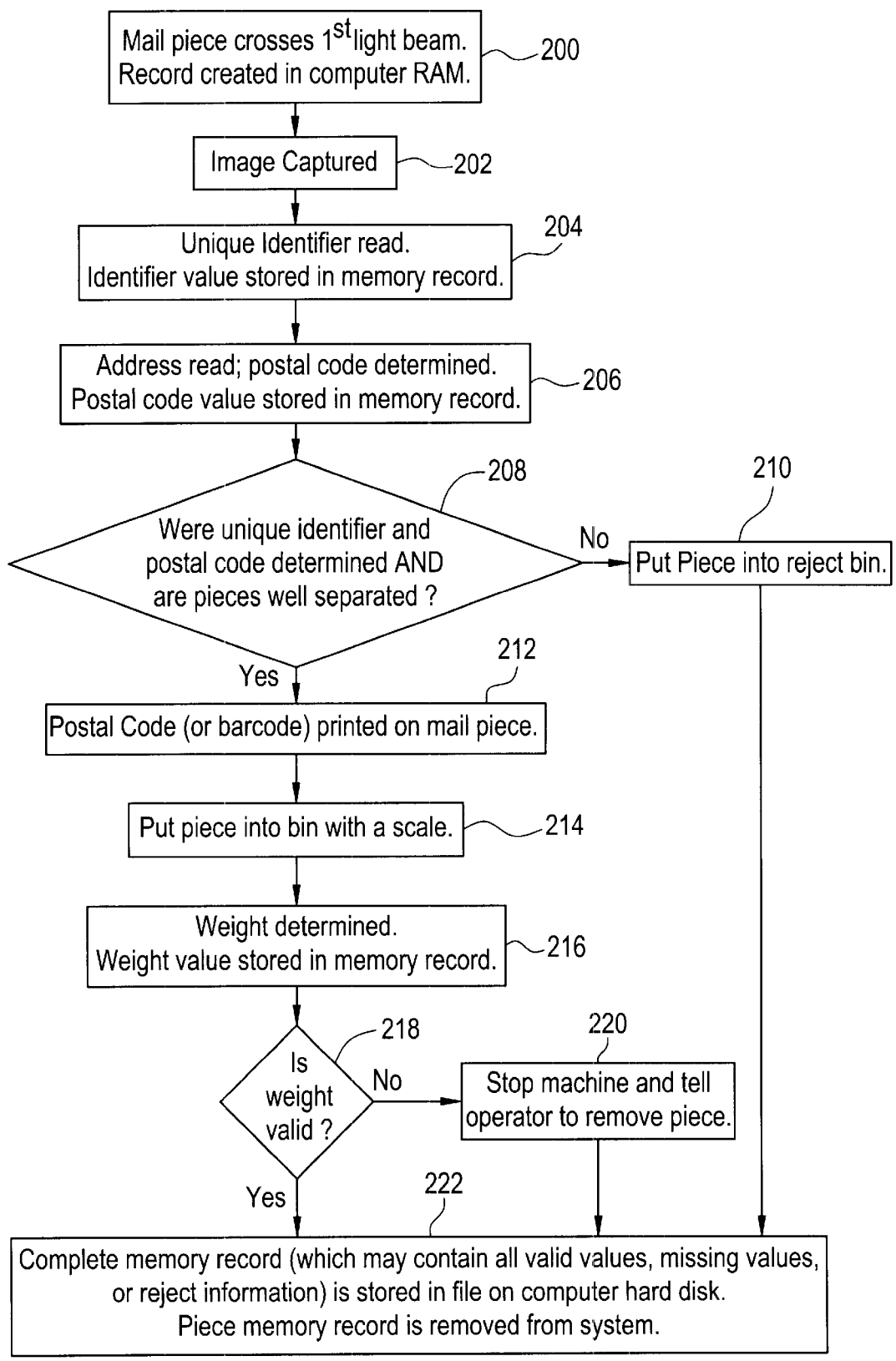

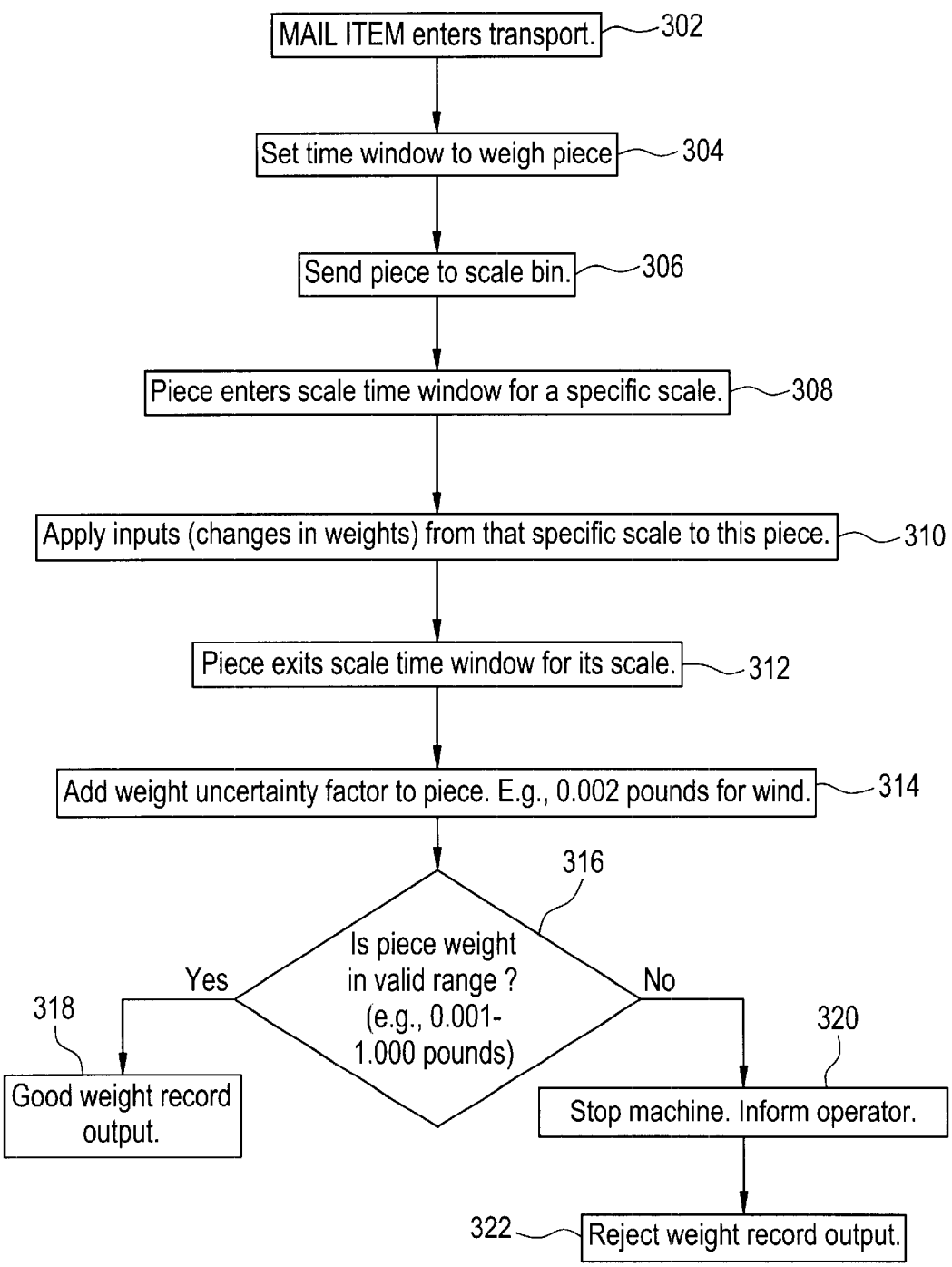

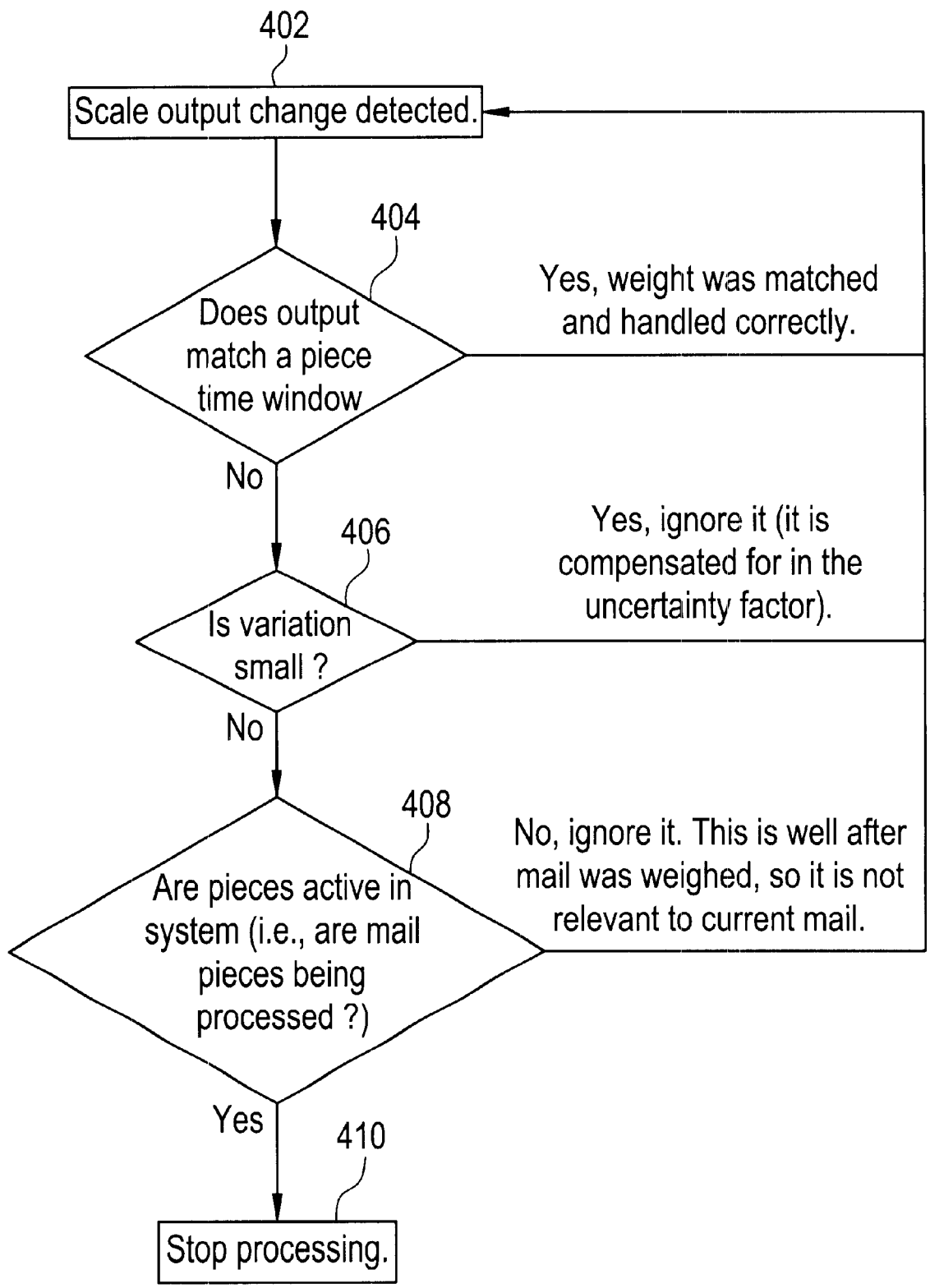

MAIL WEIGHING SYSTEM AND METHOD

FIELD OF THE INVENTION

The invention relates to mail processing systems, and more particularly to mail weighing and postage determination systems.

BACKGROUND OF THE INVENTION

Mail processing systems typically comprise a feeder assembly that singulates mail items and delivers them to a sorting assembly. Mail items may include, for example, letters, newspapers, magazines, postcards and padded envelopes. The sorting assembly may weigh, scan and sort mail items.

It is desirable for the system to process mail at a high rate of speed. Available systems are capable of sorting mail at speeds of greater than 30,000 mail items per hour. Portions of the mail processing systems, such as scanners and transport assemblies, can readily attain these speeds. A limiting factor in a mail processing system's speed may be the system's mail weighing step. The mail weighing step is of particular importance because postage amounts are based on mail item weight.

In conventional mail processing systems, mail items are weighed individually. The weight may then be relayed to a computer that calculates the correct postage and causes it to be applied to the mail item. The weighing step is typically slower than the speed of other mail processing system steps. Each mail item must be moved from the scale before another item may be weighed. This requires a pause which slows the process. Accordingly, there is a need for a weighing system capable of reliably weighing mail items, at a relatively high rate of speed.

When a mail item is introduced onto a scale, it must settle before an accurate weight is determined. This adds to the weighing time. Furthermore, if the mail item has not settled before the weight is determined, an erroneous weight value may be obtained, and therefore, an incorrect postage amount. Therefore, there is a need to account for settling time, and/or rely only on weights obtained after settling is complete.

Weighing errors may also arise because of scale vibration. Such vibration is often caused by motion of other parts of the mail processing system. Accordingly, there is a need to reduce scale vibration caused by other mail processing steps.

Significant time may be lost in a mail processing system if a mail item is inaccurately weighed or otherwise improperly processed. In a conventional system, it may be difficult to determine when an error occurs, and thus stop mail processing in a timely manner. Therefore, a need exists for a mail processing system able to detect weighing errors and cease operation immediately upon detection.

SUMMARY OF THE INVENTION

Embodiments of the present invention provide a mail weighing system that can improve the speed of mail processing by weighing mail items in bulk. The present invention can also reduce process time wasted when mail is not weighed accurately. Advantageously, mail items can be weighed more accurately, and therefore, more accurate postage determinations can be made.

Aspects of the invention include a method of processing a plurality of mail items in an automated system. In a first embodiment of the invention, a plurality of mail items enters the system and a record is created for each item. The mail items are then weighed and a determination is made as to whether the weight is a valid mail item weight. If the weight is valid, it is entered on the mail item record. If the weight is not valid, at least a portion of the mail processing system is stopped.

A further embodiment of the invention provides a method of processing mail in which mail may be weighed without isolating each mail item on a scale. The method begins by determining a first scale weight reading which may be of an empty scale or a scale containing mail items or other objects thereon. A mail item is then introduced onto this scale. The mail item weight is determined at one or more times within a time window. The difference between each consecutive scale weight is determined. If a difference between scale weight readings is not equal to zero, the difference is outputted. The mail item weight is then determined by adding all outputted scale weight difference readings. A postage amount then can be calculated based on the mail item weight.

In a further aspect of the invention a time window is set for weighing a mail item. A time window is set between determining the mail item weight and the end of the time window. The mail item is introduced onto a scale and takes time in settling. A determination is made as to whether the scale settles before the time window closes. If the scale does not settle before the time window closes, at least a portion of the mail processing system is stopped. If the scale settles before the time window closes, the mail item weight is determined, and a postage amount can be calculated based on the weight.

Embodiments of the invention also include a mail processing system. The system includes a weighing portion having a plurality of scales to weigh a plurality of mail items. The number of scales is equal to the weighing time per scale, divided by the average time between consecutive mail items entering the mail processing system's weighing portion, rounded to the next higher number. This allows for mail items to be weighed at the same rate as they are processed in other portions of the system.

DESCRIPTION OF THE DRAWINGS

The invention is best understood from the following detailed description when read with the accompanying drawings.

FIGS. 1A–D depict an illustrative weighing system according to an illustrative embodiment of the invention.

FIG. 2 is a flow chart of a mail processing method according to an illustrative embodiment of the invention.

FIG. 3 is a flow chart of a mail processing method according to a further illustrative embodiment of the invention.

FIG. 4 is a flow chart of a mail processing method according to yet another illustrative embodiment of the invention.

DETAILED DESCRIPTION OF THE INVENTION

Figure 5:
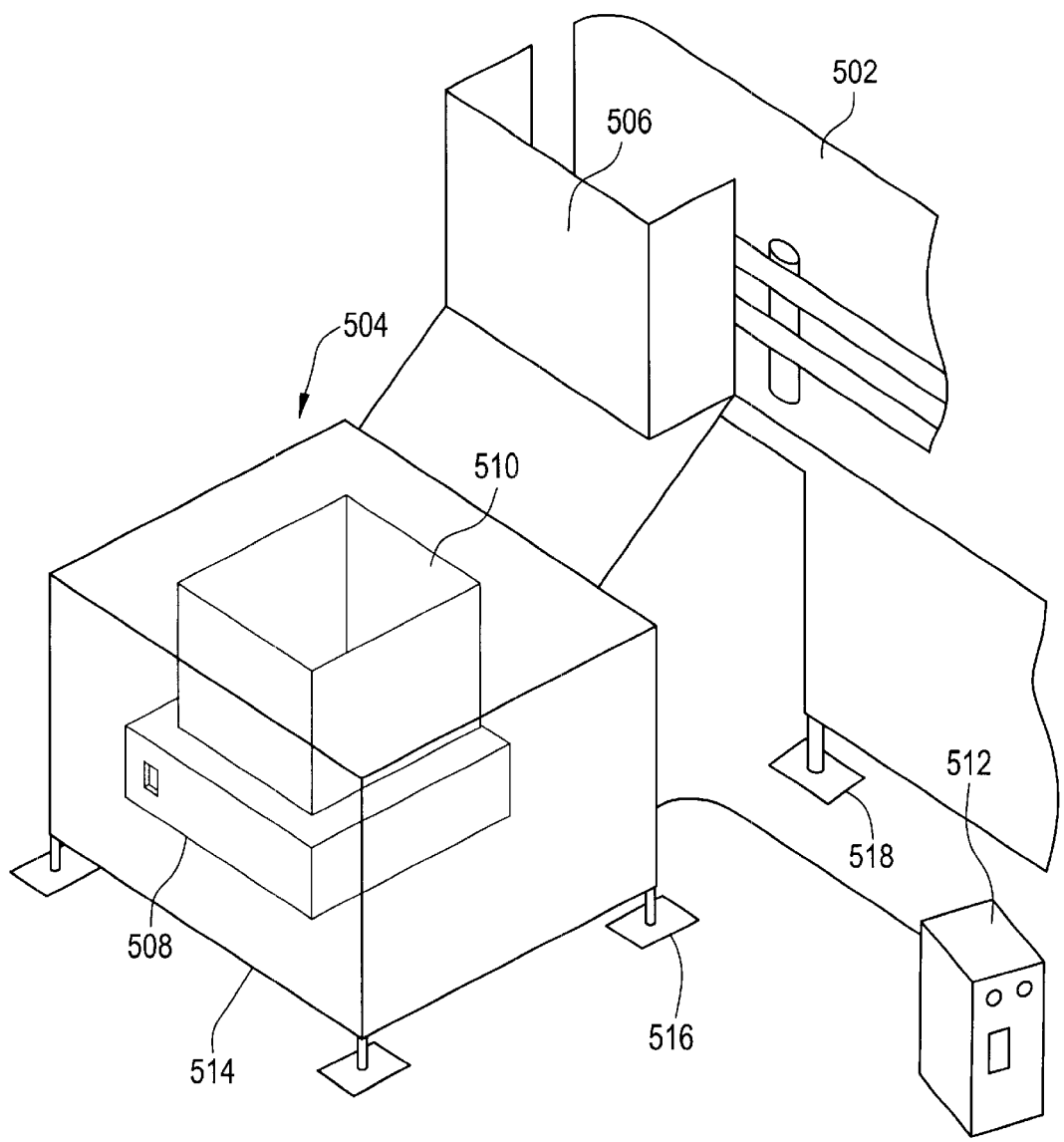
FIG. 5 depicts a mail processing system according to an illustrative embodiment of the invention.

Embodiments of the invention may allow mail items to be processed at higher speeds and more accurately than with conventional systems and methods, particularly with respect to mail item weighing. Mail item records identifying the item and including its characteristics may be accurately created and maintained for each individual mail item.

In a first embodiment of the invention a mail item record is created. The item is then weighed, and if the weight is determined to be valid, the mail item weight is entered onto the record. If the weight is determined not to be valid, at least a portion of the mail processing system is ceased. This may include the entire system or any portion thereof, not just the weighing part of the process. In an illustrative embodiment of the invention, mail may be diverted from a particular scale so that the mail item or items having an invalid weight, or otherwise affected by the invalid weight reading, may be retrieved. In a further embodiment, all mail weighing is ceased when an invalid weight is detected.

A mail item record may be created, for example, by first scanning the mail item. The scanned image is then stored electronically, preferably in temporary memory. Information is then read from the scanned image and stored, also preferably in temporary memory. Once all information desired is added to the record, it may be stored permanently. Depending on the system and its applications the mail item record, in whole or in part, may be stored temporarily or permanently at any point in the process.

The stored information may be used to formulate a unique identifier which may be entered into the record and/or applied to the mail item. Illustrative unique identifiers include a bar code, machine readable numbers, machine readable letters, machine readable symbols, radio frequency identification marks, or a combination thereof.

The stored image information may also be used to determine a postal code. Scanning equipment may be provided to read an address and determine the postal code or other routing designation.

The mail item record may contain information such as the position of the mail item within the plurality of mail items, one or more mail item dimensions, unique identifier, postal code and weight.

A determination of whether the weight is valid may be made by first selecting a valid weight range, then determining if the weight is within the selected range. An invalid weight may indicate a problem such as more than one item entering the scale together. Therefore, the system may be configured to cease operation of at least a portion of the system upon an invalid weight detection. Audio and/or visual warnings of such malfunctions may also be incorporated into the system.

In a further embodiment of the invention mail items are weighed in a manner that reduces or eliminates erroneous readings caused by mail not sufficiently settling before weights are determined. An initial weight reading is taken of the scale either empty or with objects thereon. A mail item to be weighed is then introduced onto the scale. One or more subsequent scale weight readings are determined at one or more times within a time window. The difference between each consecutive scale weight reading is determined. This includes the difference between the first of the subsequent scale readings and the initial scale reading. If a difference between scale weight readings is not equal to zero then the difference between the readings is outputted. The mail item weight is then determined by adding all outputted scale weight readings within the time window. Postage amounts can then be calculated based on the mail item weights.

In a preferred embodiment of the invention a mail item record unique to the mail item is created prior to determining the mail item weight. The mail item weight is then entered into the existing record. A postage amount based on the mail item weight can also be entered into the record. As in other embodiments of the invention, mail record information may be stored temporarily or permanently and is preferably temporarily stored until the mail record is complete, and then stored permanently.

In a further embodiment of the invention, a noise factor is added to the mail item weight. Noise, such as from wind or other vibration causing phenomena, may cause a weight reading to vary from the actual weight. The noise factor is added to the final weight to make certain that the weight is not light. This may be necessary to avoid problems with calculating correct postage. For example, if a scale reading is 2.500 lb, the actual weight may be between 2.498 and 2.502 lb. By adding 0.002 lb to the final reading, the weight value is assured of not being light, and therefore, correct postage can be determined.

FIGS. 1A–D and TABLE 1 provide an illustrative example of a weighing process according to the invention. FIG. 1A shows a bin 102 on a scale 104. In FIG. 2B a 0.500 lb mail item 106 is placed in bin 104. Scale 104 reads 2.600 lb when mail item 106 is first introduced onto the scale. In FIG. 1C scale 104 is settling and provides multiple readings in succession which may include, for example, 2.540, 2.541 and 2.490 lb In FIG. 1D, scale 104 has settled and reads 2.500 lb.

TABLE I

| Time | 0.0 | 0.1 | 0.2 | 0.3 | 0.4 | 0.5 | 0.6 | 0.7 | 0.8 | 0.9 | 1.0 | 1.1 |
|---|---|---|---|---|---|---|---|---|---|---|---|---|
| Scale | 2.00 | 2.00 | 2.60 | 2.60 | 2.60 | 2.54 | 2.54 | 2.51 | 2.49 | 2.49 | 2.50 | 2.50 |
| Software | | | 0.6 | | | −0.06 | | −0.03 | −0.02 | | 0.01 | |

TABLE 1 shows scale readings at 1/10th second intervals corresponding to the scenario depicted in FIGS. 1A–D. The first two readings of 2.00 lb represent the scale as depicted in FIG. 1A. At time 0.2 seconds, scale 104 reads 2.60 lb. At this point the difference between consecutive scale readings is 0.6 lb, and thus, the difference is outputted as it is not equal to zero. At time 0.3 seconds the scale is still reading 2.60 lb, and therefore, the difference between consecutive scale readings is zero, and hence there is no outputted weight. The same situation occurs at 0.4 seconds. At 0.5 seconds, the scale reads 2.54 lb indicating a difference in weight between consecutive readings of −0.06 lb. The weight has not changed at 0.6 seconds, and therefore no weight is outputted. Changes again occur at 0.7 and 0.8 seconds, and differences of weights are outputted as −0.03 lb and −0.02 lb, respectively. Again, at time 0.9 seconds, there is no change in weight, and therefore no outputted value. At time 1.0 seconds, the scale reading has increased by 0.01 to 2.50 lb. The scale reading is then constant at 1.1 seconds. The outputted weights are then added to determine the weight of the mail item. Included in the outputted weights is a value of 0.6 lb at 0.2 seconds which corresponds to the mail item being introduced onto the scale. The smaller weights outputted in this sequence represent the scale settling by showing increases and decreases in weight values. By adding the outputted weights, the mail item weight is determined taking into consideration variations in weights due to settling. For the values in TABLE 1, the weight is calculated as follows:

0.6+(−0.06)+(−0.03)+(−0.02)+0.01=2.50 lb

Although TABLE 1 shows increments of 0.1 seconds, other time intervals may be chosen which may take into account characteristics of the mail processing system such as the usual settling time, types of mail items being processed and the speed of the system.

FIG. 2 depicts a flow chart of a mail processing system according to an exemplary embodiment of the invention. In step 200 a mail item crosses a first light beam or other scanning mechanism. An image is captured in step 202 and preferably recorded in temporary memory. The scanned image may include a unique identifier, or an identifier may be formulated from the scanned image. Either way, a unique identifier can be stored as part of the mail item record in step 204. In step 206 the address is read from the scanned image and a postal code may be determined from the address. The postal code may be added to the stored mail item record. In step 208 a check may be implemented to determine whether the unique identifier and postal code were determined and added to the record, and whether the pieces were separated properly. If the answer to any of these questions is "no", then the mail item is put into a rejection bin, or otherwise removed from the processing system. If it is determined that the answers to all questions in step 208 are "yes," then the postal code, such as a bar code, may be printed on the mail item in step 212. In step 214 the mail item is placed on the scale. In step 216 the mail item weight is determined and the weight value is added to the mail item record. Optionally, in step 218 a determination may be made as to whether the mail item weight is valid. If the weight is not valid at least a portion of the mail process may be stopped, and this occurrence may be added to the mail item record. If it is determined that the mail item weight is valid is step 218, then the weight may be added to the mail item record in step 222. A postage amount based on the mail item weight can also be determined and included in the stored record. Preferably the mail item record, in whole or in part, is then stored in permanent memory and the temporary memory containing mail item record information can be removed from the system.

FIGS. 3 and 4 provide additional detail of the mail processing system described by FIG. 2. FIG. 3 is a flow chart of a mail processing system according to an illustrative embodiment of the invention. A mail item enters a transport portion of the mail processing system in step 302. In step 304 a time window is set in which each mail item is processed. Time windows cannot overlap for mail items being processed by the same scale. If a mail item's time window overlaps a previous mail item's time window, it indicates there is insufficient separation between the mail items. When this occurs the mail item or items are sent to a rejection bin, or otherwise removed from the system. If it is determined that mail items are adequately separated, then the mail item is sent to a scale in step 306. The mail item enters a scale time window for a specific scale in step 308. In step 310 the mail item settles, during which time the mail item is weighed at regular intervals. Any changes in weight detected between consecutive weighings are outputted. A step (not shown) may also be incorporated to evaluate whether particular changes should be utilized or ignored as erroneous readings. The mail item exits the scale time window in step 312. A weight uncertainty or noise factor then may be added to the weight in step 314. In step 316 it is determined whether the weight is within a valid range. An exemplary valid range is 0.001 to 1.000 lb. If the weight is not within the valid weight range then in block 320 at least a portion of the mail processing system is stopped. The weight record that has been outputted is then rejected in block 322. If the weight is in a valid range then in block 318 the weight is recorded.

In preferred embodiments of the invention, the scale outputs values only when the scale is at least temporarily settled. By use of software, the output is reduced only to changes in the scale output or reading. However, the scale output may change any time due to factors such as vibration caused by wind or mail pieces entering the scale.

FIG. 4 is a flow chart depicting how weight information that may not be synchronized with actual mail items is handled. In step 402 a scale output change is detected. In block 404 it is determined whether the output matches a mail item time window. Matching indicates that the mail item was processed correctly. The next scale output change may then be detected. If the output does not match a mail item time window, then in step 406 it is determined whether the variation was small, i.e. insignificant. If it is determined that the variation is insignificant, the variation can be ignored and may be compensated for by a noise factor. The next scale output change may then be detected. If the variation in block 406 is not insignificant, a determination is made as to whether mail items are active in the system in block 408. If mail items are not active in the system it can be assumed that the variation has occurred after the mail item was weighed, and therefore, the variation is not relevant to the current mail. The next scale output change may then be detected in block 402. If mail items are active in the system when a significant variation in weight is detected, then in step 410 at least a portion of the mail processing is ceased. The last few mail items may then be removed from the system, and full mail processing may be resumed.

In a further embodiment of the invention a plurality of scales is incorporated into the system to maximize the speed of the process. The number of scales used is equal to the weighing time per scale divided by the average time between consecutive mail items entering the mail processing system's weighing portion, rounded to the next higher number. The mail processing system may further comprise a means for creating a mail item record and entering information into the record. A means for determining the validity of the weight may also be provided. A means for stopping at least a portion of the mail processing system if a mail item weight is not valid may also be included.

In an exemplary embodiment of the invention the weighing portion of the mail processing system is isolated from vibration causing components of the mail processing system.

FIG. 5 depicts a mail processing system according to an illustrative embodiment of the invention. Included is a transport portion 502 which brings mail items to a weighing portion 504. A drop box 506 may be employed to direct mail items from transport portion 502 to weighing portion 504. Weighing portion 504 includes a scale 508 to weigh mail items. In the illustrative embodiment depicted in FIG. 5, a bin 510 is used to collect mail items for weighing. Mail items accumulate in bin 510 and are weighed by scale 508. A computer 512 is functionally connected to scale 508 for recording weights and calculating mail item weights. Computer 512, or one or more other electronic devices functionally connected to the system, can provide and record other mail item information into the same record as the weight or into a separate record. Other mail item information may include for example, postage amounts based on mail item weights. Other electronic devices may include for example, one or more additional computers, scanners or sensors.

Various means may be employed to isolate weighing portion 504 from vibration causing components of the mail processing system. For example, scale 508 may be situated in an enclosure 514. Isolation pads 516 may also be used to reduce vibration of scale 508. Other portions of the mail processing machine may be fitted with vibration reducing pads such as shown by part 518.

Even with vibration dampening features, mail item settling may still be a problem. To further minimize scale reading errors caused by settling, or as an alternative approach, a time window may be set for weighing a mail item. After a mail item is introduced onto the scale, it may be determined whether the scale settles before the time window closes. If the scale does not settle before the time window closes, at least a portion of the mail processing system may be stopped. If the scale settles before the time window closes, then the mail item weight may be considered to be accurate and included in a mail record. Added protection may be provided by checking whether the mail item weight is within a valid range and/or by adding an uncertainty factor to the mail item weight.

While the invention has been described by illustrative embodiments, additional advantages and modifications will occur to those skilled in the art. Therefore, the invention in its broader aspects is not limited to specific details shown and described herein. Modifications, for example, to the weighing algorithm, mail item record information, and configuration of mail processing system components, may be made without departing from the spirit and scope of the invention. Accordingly, it is intended that the invention not be limited to the specific illustrative embodiments but be interpreted within the full spirit and scope of the appended claims and their equivalents.

What is claimed is:

1. A method of processing a plurality of mail items in an automated system, the method comprising:
   creating a mail item record;
   weighing a mail item;
   determining if the mail item weight is valid;
   entering the mail item weight in the mail item record; and
   ceasing at least a portion of the mail processing if the mail item weight is not valid.

2. The method of claim 1 wherein creating the mail item record comprises the steps of:
   scanning the mail item;
   storing the scanned image;
   reading information from the scanned image; and
   storing the information read.

3. The method of claim 2 further comprising:
   formulating a unique identifier from the stored information;
   entering the unique identifier into the record.

4. The method of claim 3 further comprising:
   applying the unique identifier to the mail item.

5. The method of claim 4 wherein the unique identifier is selected from the group consisting of, bar code, machine readable numbers, radio frequency identification mark, machine readable letters, machine readable symbols, and a combination thereof.

6. The method of claim 2 further comprising:
   determining a postal code from the stored image information.

7. The method of claim 1 further comprising:
   calculating a postage amount based on the mail item weight.

8. The method of claim 1 wherein the mail item record contains information selected from the group consisting of, position within the plurality of mail items, one or more mail item dimensions, unique identifier, postal code, weight and postage amount.

9. The method of claim 1 wherein determining if the weight is valid comprises:
   selecting a valid weight range; and
   determining if the weight is within the selected range.

10. A method of processing mail comprising:
    determining a first scale weight reading;
    introducing a mail item onto the scale;
    determining one or more subsequent scale weight readings at one or more times within a time window;
    determining the difference between each consecutive scale weight reading including the first and subsequent scale weight readings;
    if a difference between scale weight readings is not equal to zero, then outputting the difference between scale weight readings; and
    determining a mail item weight by adding all outputted scale weight readings.

11. The method of claim 10 further comprising:
    creating a mail item record unique to the mail item prior to determining the mail item weight; and
    entering subsequently determined information into the record, wherein the subsequently determined information is selected from the group consisting of the mail item weight, postage based on the mail item weight, and a combination thereof.

12. The method of claim 11 further comprising:
    temporarily storing the created mail item record; and
    permanently storing the mail item record upon completion of the mail item record for the particular mail item.

13. The method of claim 10 further comprising:
    designating a valid weight range;
    determining if the mail item weight falls within the valid weight range.

14. The method of claim 13 further comprising:
    stopping at least a portion of the mail processing if the mail item weight falls outside of the valid weight range.

15. The method of claim 10 further comprising:
    adding a noise factor to the mail item weight.

16. The method of claim 10 further comprising:
    calculating a postage amount based on the mail item weight.

17. A mail processing system comprising:
    a weighing portion having a plurality of scales to weigh a plurality of mail items;
    wherein the number of scales equals the weighing time per scale divided by the average time between consecutive mail items entering the mail processing system's weighing portion rounded to the next higher number.

18. The mail processing system of claim 17 further comprising:
    a means for creating a mail item record for each mail item processed prior to weighing the mail; and
    wherein mail item weights are entered in the record.

19. The mail processing system of claim 17 further comprising:
a means for determining if a mail item weight is valid.

20. The mail processing system of claim 17 further comprising:
a means for stopping at least a portion of the mail processing system if a mail item weight is invalid.

21. The mail processing system of claim 17 wherein the weighing portion is isolated from vibration causing components of other portions of the mail processing system.

22. The mail processing system of claim 17 further comprising:
a means for calculating a postage amount based on the mail item weight.

23. A method of processing a plurality of mail items in a mail processing system having a weighing portion, wherein the method comprises:
determining the time between which consecutive mail items will enter the weighing portion;
determining the weighing time for a single mail item;
dividing the weighing time for a single mail item by the time between consecutive mail items to obtain a quotient;
rounding the quotient to the next highest number;
providing a plurality of scales, the number of which is the quotient rounded to the next highest number; and
weighing each mail item on a scale, the scales being utilized in a sequence such that each mail item is weighed in a time period less than or approximately equal to the time between consecutive mail items entering the weighing portion.

24. The method of claim 23 further comprising:
creating a mail item record unique to a mail item prior to weighing the mail item; and
entering subsequently determined information into the record wherein the subsequently determined information is selected from the group consisting of the mail item weight, postage based on the mail item weight, and a combination thereof.

25. The method of claim 24 further comprising:
temporarily storing the mail item record; and
permanently storing the mail item record upon completion of the mail item record for the particular mail item.

26. The method of claim 23 further comprising:
calculating a postage amount based on the mail item weight.

27. A method of processing mail items in a mail processing system, the method comprising:
setting a time window for weighing a mail item;
introducing the mail item onto a scale;
determining if the scale settles before the time window closes;
if the scale does not settle before the time window closes, ceasing at least a portion of the processing of the mail item; and
if the scale settles before the minimum time window closes, determining the mail item weight.

28. The method of claim 27 further comprising:
calculating a postage amount based on the mail item weight.

29. The method of claim 27 further comprising:
setting a valid weight range;
determining if the weight is in the valid weight range; and
stopping at least a portion of the mail processing if the weight is not in the valid weight range.

30. The mail processing system of claim 27 further comprising:
adding an uncertainty factor to the mail item weight.

31. The mail processing system of claim 27 further comprising:
creating a mail item record unique to the mail item; and
entering subsequently determined information into the record wherein the subsequently determined information is selected from the group consisting of the mail item weight, postage based on the mail item weight, and a combination thereof.

32. The method of claim 31 further comprising:
temporarily storing the mail item record; and
permanently storing the mail item record for a particular item upon completion of the mail item record.

* * * * *